United States Patent
Maruyama

(10) Patent No.: US 6,396,553 B1
(45) Date of Patent: *May 28, 2002

(54) TWISTED NEMATIC LIQUID CRYSTAL DISPLAY DEVICE WITH IMPROVED VIEWING ANGLE CHARACTERISTICS

(75) Inventor: Muneo Maruyama, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,269

(22) Filed: Jun. 11, 1999

(30) Foreign Application Priority Data

Jun. 16, 1998 (JP) .......................................... 10-168476

(51) Int. Cl.$^7$ ........................... G02F 1/1335; G02F 1/13
(52) U.S. Cl. ...................... 349/121; 349/12 D; 349/181
(58) Field of Search ................................. 349/117, 119, 349/120, 121, 181

(56) References Cited

U.S. PATENT DOCUMENTS

| | | | |
|---|---|---|---|
| 5,583,679 A | * 12/1996 | Ito et al. ....................... | 349/118 |
| 5,638,200 A | * 6/1997 | Xu .............................. | 349/117 |
| 5,864,376 A | * 1/1999 | Takatori ....................... | 349/129 |
| 5,895,106 A | * 4/1999 | VanderPloeg et al. ......... | 349/120 |
| 5,990,997 A | * 11/1999 | Jones et al. .................. | 349/120 |

FOREIGN PATENT DOCUMENTS

| | | |
|---|---|---|
| JP | 4-179127 | 6/1992 |
| JP | 6-43452 | 2/1994 |
| JP | 6-167707 | 6/1994 |
| JP | 8-50270 | 2/1996 |
| JP | 8-95034 | 4/1996 |
| JP | 8-160414 | 6/1996 |
| JP | 9-120005 | 5/1997 |
| JP | 10-39341 | 2/1998 |
| JP | 10-139778 | 5/1998 |

* cited by examiner

Primary Examiner—Toan Ton
(74) Attorney, Agent, or Firm—Scully, Scott, Murphy & Presser

(57) ABSTRACT

A polarizing plate, a phase compensation film, a liquid crystal panel, a phase compensation film, and a polarizing plate are stacked on a planar light source in this order. A color filter substrate and an active matrix substrate are arranged parallel to each other in the liquid crystal panel. A transparent common electrode and a color filter are formed on a transparent glass substrate in the color filter substrate. Thin film transistors and transparent pixel electrodes are arranged in the form of a matrix on a transparent glass substrate in the active matrix substrate. The color filter substrate and the active matrix substrate are adhered to each other with a sealing agent. A TN liquid crystal layer including a TN liquid crystal having a twisted angle of substantially 90° is sealed between the color filter substrate and the active matrix substrate by the sealing agent. A chiral agent is added to the liquid crystal in the TN liquid crystal layer, and the helical pitch of the liquid crystal is 60 μm or more.

9 Claims, 4 Drawing Sheets

TWISTED NEMATIC LIQUID CRYSTAL DISPLAY DEVICE WITH IMPROVED VIEWING ANGLE CHARACTERISTICS

BACKGROUND OF THE INVENTION

1. Field of the Invention

The present invention relates to a liquid crystal display device in which the viewing angle characteristic of a display screen is improved, and particularly to a liquid crystal display device having, as a characteristic feature, a helical pitch between a liquid crystal layer and a TN liquid crystal layer of a color liquid crystal display panel having nematic liquid crystal display elements.

2. Description of Related Art

In a general liquid crystal display device, light from a light source is modulated to perform an image display. A visual angle is offset from the normal direction of the liquid-crystal panel due to the birefringence of a liquid crystal, retardations are different from each other. For this reason, visual angle dependency is large.

Conventionally, it is proposed to widen a visual angle at which a correct image can be seen. For example, as a first prior art, a liquid crystal display device planning an improved visual angle characteristic is disclosed in Japanese Unexamined Patent Publication No.8-95034 (Patent No.2706902) published on Apr. 12, 1996.

In the first prior art, a phase plate having an optically negative uniaxial property is arranged in a color liquid crystal display device. In addition, the optical axis of the phase plate is set to be inclined from the normal direction of a film by 5 to 50°.

More specifically, in a twisted nematic type (TN type) color liquid crystal display device, twisted nematic type liquid crystal cells, each of which is constituted by a color filter, a pixel electrode, and a nematic liquid crystal substantially having a twisted angle of 90°, are arranged. Polarizing plates are arranged both the sides of the liquid crystal cell, and the phase plate described above is sandwiched between the liquid crystal cell and one of the polarizing plates. The phase plate has a minimum value of the absolute value of a retardation which is not zero, and the direction indicating the minimum value is inclined from the normal direction by 5 to 50°.

A plurality of stripe electrodes are arranged to cross each other, and pixels are formed at the crossing portions of the electrodes.

The phase plate is an optical anisotropic element having an optically negative uniaxial property as described above. The optical axis of the phase difference plate is inclined from the normal direction of a film by 5 to 50°. The light transmittance of the phase difference plate is 80% or more. Assume that principal refractive indexes in a film surface are represented by nx and ny, that a refractive index in a direction of thickness is represented by nz, and that a thickness thereof is represented by d. In this case, the principal refractive indexes of the three axes preferably have preferably the following relationships.

Expression 1 is preferably satisfied, a retardation expressed by Expression 2 is preferably 20 nm to 400 nm, and front retardation expressed by Expression 3 is preferably 50 nm or less.

$$nz < ny = nx \quad (1)$$

$$(((nx+ny)/2) - nz) \times d \quad (2)$$

$$|nx - ny| \times d \quad (3)$$

It is mentioned that a disk-like compound is preferably contained as an optical anisotropic element. For example, the compound has the following structure. That is, a benzene derivative, a cyclohexane derivative, or an aza crown based or phenylacetylene based macro cycle is used as a mother core, and straight chain alkyl groups, alkoxy groups, substitutional benzoyloxy groups, or such are radially substituted as a straight chain.

In this manner, a liquid crystal display device, having a wide viewing angle, in which degradations of image quality such as degradation of contrast, gradation inversion, and a change in hue caused by a visual angle are reduced, can be obtained.

As a second prior art, a liquid crystal display device having as its object to improve the viewing angle characteristic of a display screen is disclosed in Japanese Unexamined Patent Publication No.9-120005 published on May 6, 1997.

Although the second prior art is similar to the first prior art, the first prior art and the second prior art are different from each other in characteristics of phase plates. In the phase plate of the second prior art, a principal refractive index na exists in a plate-like flat surface. A principal refractive index nc (na≠nc) exists in direction which is orthogonal to the principal refractive index na and clockwise or counterclockwise inclined by an angle θ from the plate surface about the principal refractive index na along a plane vertical to the plate surface. In addition, a principal refractive index nb which is smaller than the principal refractive indexes na and nc exists in a direction which is clockwise or counterclockwise inclined by the angle θ along the plane from the normal direction of the plate surface about the principal refractive index na along the plane.

In the phase plate, when a visual angle is inclined from a screen normal direction to a positive visual angle direction, a coloring phenomenon that a displayed image is colored at an angle larger than a predetermined angle and/or an inversion phenomenon that black and white are inverted occurs. On the other hand, when the visual angle is inclined in a reversed visual angle, contrast is sharply degraded.

In the second prior art, for example, a nematic liquid crystal material having a refractive index anisotropy Δn of 0.08 is used for a liquid crystal layer, and the thickness of the liquid crystal layer is set to be 4.5 μm. As the phase plate, a plate having a biaxial property and obtained by extending a macromolecular material such as polycarbonate or polyester is used. A first retardation value which is a product ((nc−na)×d) of the difference between the principal refractive indexes nc and na, and the thickness d in the phase plate is 20 nm. A second retardation value which is a product ((nc−nb)×d) of the difference between the principal refractive indexes nc and nb, and the thickness d is 135 nm. In addition, a relationship (na≠nc>nb) is satisfied. Furthermore, an inclination direction angle θ is 40°.

As the third prior art, a liquid crystal display device having an improved visual characteristic is also disclosed in Japanese Unexamined Patent Publication No.6-43452 published on Feb. 18, 1994.

In the third prior art, the twisted angle of a twisted nematic liquid crystal is set to be smaller than 80°. The refractive index anisotropy Δn of the liquid crystal layer is set to be 0.02 to 0.12. In addition, the retardation Δn·d (Δn×d) of the liquid crystal layer is set to be 200 to 1,200 nm, and the retardation Δn·d of the phase plate is set to be 10 to 200 nm. A liquid crystal drive voltage is regulated to be equal to or smaller than a voltage at which a light transmittance with respect to one obtained at a no voltage applied state when no phase plate is used is set to be 1%.

However, in these prior arts, although a viewing angle with respect to contrast is improved, an image becomes disadvantageously yellowish when viewed from an oblique direction. Improvement on gradation inversion from a downward direction is insufficient.

SUMMARY OF THE INVENTION

It is an object of the present invention to provide a liquid crystal display device which can prevent a change in color to yellow when viewed from an oblique direction, and prevent gradation degradation from a downward direction.

According to one aspect of the present invention a liquid crystal display device may have a light source, a liquid crystal panel arranged on the light source, and a phase compensation film arranged on the liquid crystal panel. The liquid crystal panel may include a twisted nematic liquid crystal layer having a twisted angle of substantially 90° and a helical pitch equal to or more than 60 μm.

According to one aspect of the present invention, since the helical pitch of the twisted nematic liquid crystal layer is properly regulated, coloring of yellow made when viewed from an oblique direction can be suppressed. In addition, gradation inversion from a downward direction can be suppressed.

DESCRIPTION OF THE PREFERRED EMBODIMENTS

Figure 1:
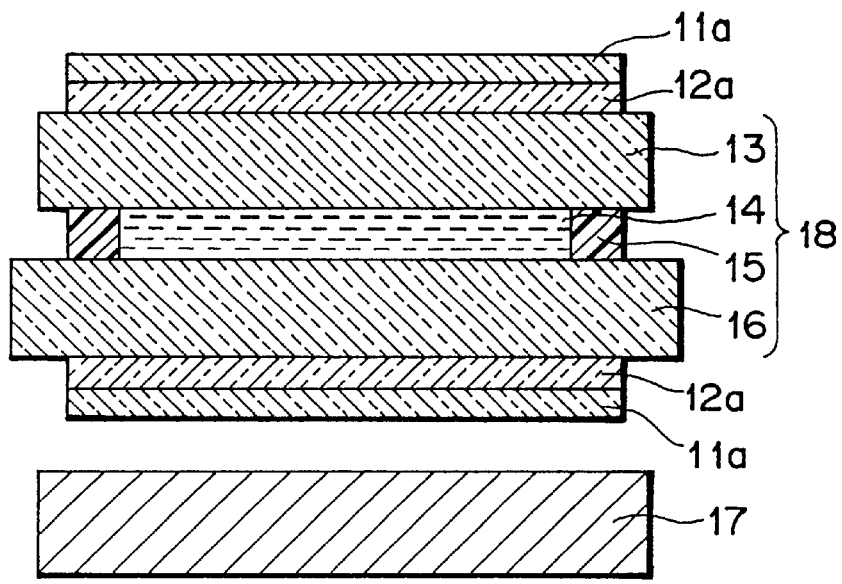
FIG. 1 is a sectional view showing the structure of a liquid crystal display device according to the first embodiment of the present invention.

A liquid crystal display device according to the embodiment of the present invention will be described below with reference to the accompanying drawings. FIG. 1 is a sectional view showing the structure of a liquid crystal display device according to the first embodiment of the present invention.

In the liquid crystal display according to the first embodiment, a planar light source 17 is provided. A polarizing plate 11b, a phase compensation film 12b, a liquid crystal panel 18, a phase compensation film 12a, and a polarizing plate 11a may be stacked on the planar light source 17 in this order.

A color filter substrate 13 and an active matrix substrate 16 are arranged parallel to each other in the liquid crystal panel 18. A transparent common electrode and a color filter are formed on a transparent glass substrate in the color filter substrate 13. Thin film transistors and transparent pixel electrodes are arranged in the form of a matrix on a transparent glass substrate in the active matrix substrate 16. The color filter substrate 13 and the active matrix substrate 16 are adhered to each other with a sealing agent 15. A TN liquid crystal layer 14 including a twisted nematic (TN) liquid crystal having a twisted angle of substantially 90° is sealed between the color filter substrate 13 and the active matrix substrate 16 by the sealing agent 15.

A chiral agent is added to the liquid crystal in the TN liquid crystal layer 14, and the helical pitch of the liquid crystal is 60 μm or more. The chiral agent prevents reverse-twist from being generated. The helical pitch is a pitch required to twist the TN liquid crystal added of chiral agent by 360°.

The chiral agent is a compound containing an asymmetric carbon atom. The asymmetric carbon atome is a carbon atom coupled with four different atoms or groups. When the chiral agent is added to the TN liquid crystal, liquid crystal molecules are twisted by interaction of energy of respective atoms. The twisted direction (clockwise or counterclockwise) is determined depending on the positions of atoms or groups coupled to each carbon atom. In the present invention, the twisted direction may be either one of these directions.

As a method of twisting liquid crystal molecules by 360°, a method of injecting a TN liquid crystal into a wedge type cell and leaving the TN liquid crystal for about ten hours is known. Thereafter, if the cell is observed by a polarization microscope, disclination lines appear in the form of stripes every 180°-twist. Therefore, the TN liquid crystal is twisted by 360° from a certain disclination line to a second disclination line therefrom.

A helical pitch, as described above, is a pitch (thickness) required to twist the TN liquid crystal by 360° The pitch (thickness) can be expressed by a difference between a cell gap generated by the disclination line described above and a cell gap generated by the second disclination line therefrom.

The thickness of the TN liquid crystal layer 14 is preferably 3.0 to 6.0 μm. If the thickness of the TN liquid crystal layer 14 is smaller than 3.0 μm, the liquid crystal itself may sufficiently function. If the thickness of the TN liquid crystal layer 14 exceeds 6.0 μm, the twisted angle becomes excessive. For example, the refractive index anisotropy Δn of the TN liquid crystal is 0.08, and the thickness of the TN liquid crystal layer 14 is 0.5 μm.

A cold cathode type fluorescent lamp and a light guide plate for uniformalizing light from the cold cathode type fluorescent lamp planar are provided in the surface light source 17.

The phase compensation film 12a is formed between the color filter substrate 13 and the polarizing plate 11a, and the phase compensation film 12b is formed between the active matrix substrate 16 and the polarizing plate 11b. The phase compensation films 12a and 12b have optically negative anisotropy, and the optical axes of the phase compensation films 12a and 12b are inclined with respect to the normal directions thereof. As the phase compensation films 12a and 12b, for example, WV films available from Fuji Photo Film Co., Ltd. and having negative anisotropy are preferably used.

The polarizing plates 11a and 11b are preferably arranged such that the transmission axes thereof are offset from each other by 90°. The liquid crystal panel 18 and the phase compensation films 12a and 12b are held between the polarizing plates 11a and 11b.

Figure 2:
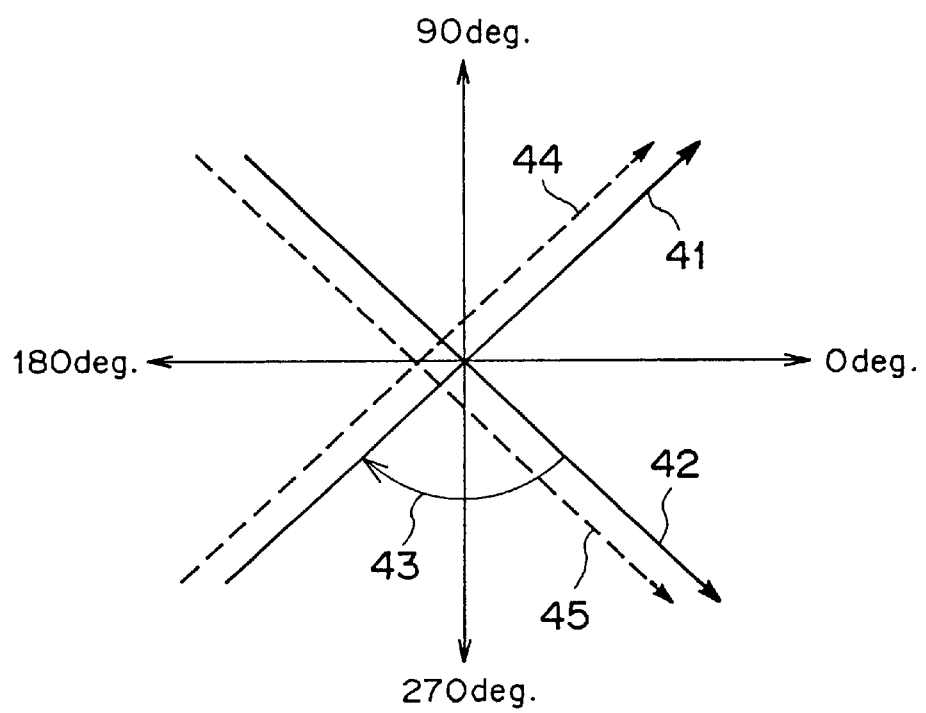
FIG. 2 is a typical view showing the relationship between rubbing directions and the inclination directions of optical axes.

FIG. 2 is a typical view showing the relationship between rubbing directions and the inclination directions of optical axes. In the first embodiment, a rubbing direction 41 on the color filter substrate 13 side and a rubbing direction 42 on the active matrix substrate 16 side are orthogonal to each other. For this reason, a liquid crystal in the TN liquid crystal layer 14 is twisted in the arrow direction of a twisted angle 43. At this time, the twisted angle is substantially 90°. An inclination direction 44 of the optical axis of the phase compensation film 12a is equal to the rubbing direction 41 on the color filter substrate 13 side. In addition, an inclination direction 45 of the optical axis of the phase compensation film 12b is equal to the rubbing direction 42 on the active matrix substrate 16 side.

Figure 3:
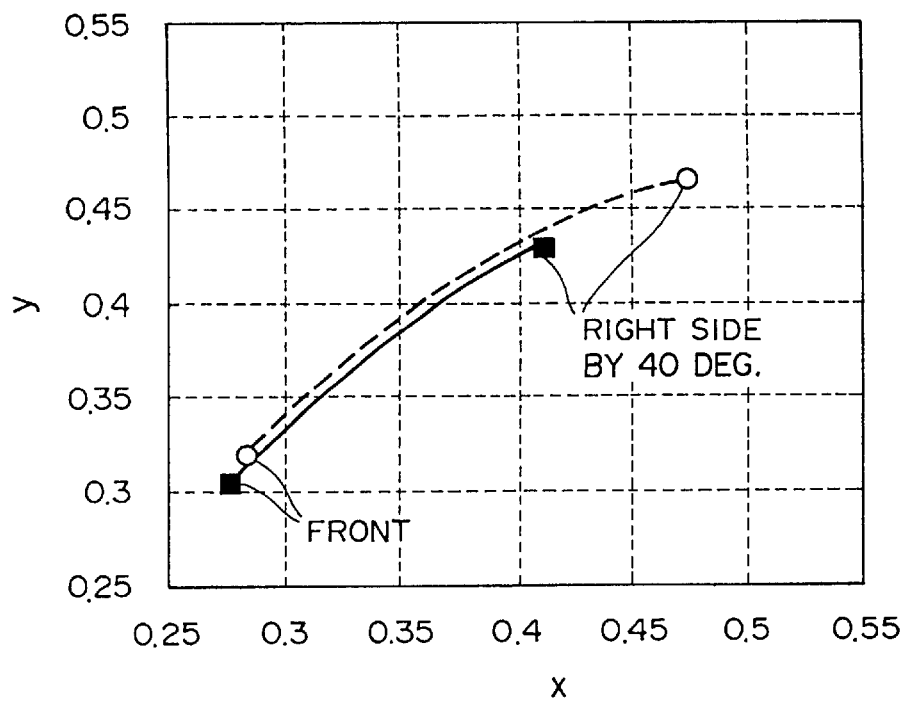
FIG. 3 is an x-y chromaticity diagram showing a change in hue depending on helical pitches.

The operation of the liquid crystal display device according to the first embodiment arranged as described above will be described. FIG. 3 is an x-y chromaticity diagram showing a change in hue depending on helical pitches.

When light is emitted from the planar light source 17, and the light is transmitted through the TN liquid crystal layer 14, as the transmission direction is inclined from a normal, a phenomenon that a gradation property is degraded by the birefringence of the TN liquid crystal layer 14 or a phenomenon that a black display floats occurs. When the black display floats, an image becomes bright.

In this embodiment, the phase compensation films 12a and 12b compensate for the phenomenon that a black display floats. A contrast ratio in an oblique direction increases, and a display characteristic that a viewing angle is widened is obtained.

As indicated by a solid line and marks ■ in FIG. 3, when a chiral pitch is set to be 120 μm, and a viewpoint is inclined from the front in the clockwise direction on a half-tone display, locus extension toward the upper right portion on the x-y chromaticity is suppressed. That is, a preferable display which is suppressed from being yellowish can be obtained.

On the other hand, a helical pitch in a conventional liquid crystal display device is generally about 40 μm. For this reason, as indicated by a broken line and marks ○ in FIG. 3, when a viewpoint is inclined from the front in the clockwise direction on a half-tone display, a locus largely extends toward a extension toward the upper right portion which is yellowish. In this manner, in the conventional liquid crystal display device, a coloring phenomenon in yellow occurs in an oblique direction on a white display or a half-tone display.

Figure 4:
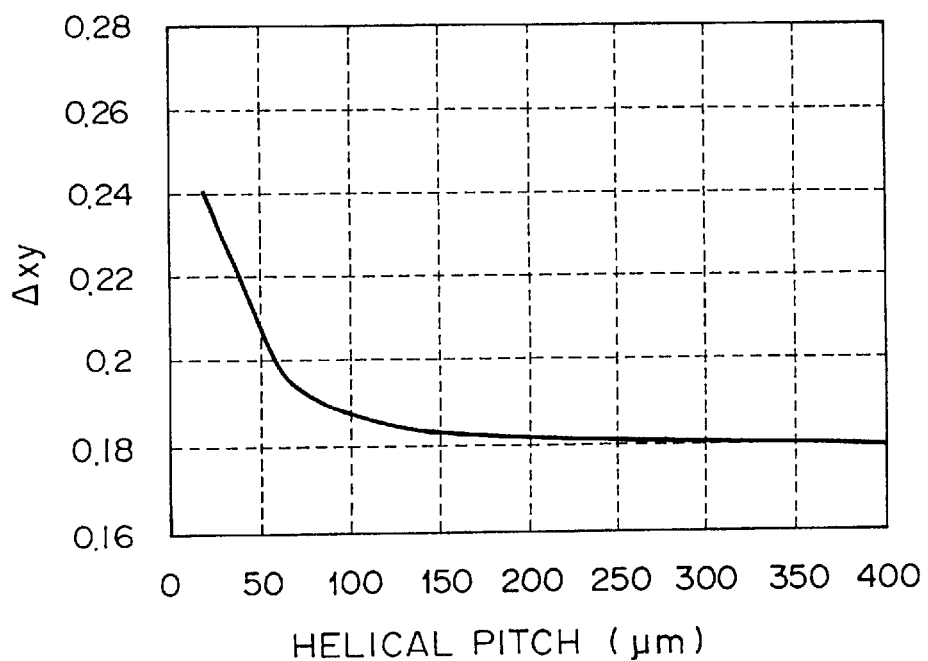
FIG. 4 is a graph showing the relationship between a helical pitch and a distance Δxy on the chromaticity diagram.

FIG. 4 is a graph showing the relationship between a helical pitch plotted on an abscissa and a distance Δxy on the chromaticity diagram plotted on an ordinate. The distance Δxy on the chromaticity diagram is a distance between a point obtained when a viewpoint is located in the front and a point obtained when a viewpoint is clockwise inclined to right side by 40°. It is shown that a preferable display can be obtained in which an amount of hue shifted from the front becomes small, as the value of the distance Δxy decreases.

As shown in FIG. 4, as the helical pitch is larger than a conventional and general value, i.e., 40 μm, the distance Δxy decreases. Especially, when the helical pitch is larger than 60 μm, the effect is large. However, the helical pitch exceeds 120 μm, reverse-twist easily occurs. For this reason, the helical pitch is preferably equal to or less than 120 μm.

A cause of generation of hue and suppression of the generation of hue will be described below. In this case, it is assumed that WV films available from Fuji Photo Film Co., Ltd. are used as the phase compensation films 12a and 12b. As described above, depending on the relationship between the rubbing direction 41 and the rubbing direction 42, the TN liquid crystal layer is twisted in the arrow direction of the twisted angle 43. At this time, the twisted angle is substantially 90°. The phase compensation film 12a compensates for the half of the TN liquid crystal layer 14 on the color filter substrate 13 side, and the phase compensation film 12b compensates for the other half of the TN liquid crystal layer 14 on the active matrix substrate 16 side.

For the compensation, the optical axes of the phase compensation films are desirably twisted with respected to the optical axis of the twisted TN liquid crystal layer. However, in fact, the optical axes of the phase compensation films are not twisted. For this reason, since symmetry between the optical axis of the TN liquid crystal layer having positive anisotropy and the optical axes of the phase compensation films having negative anisotropy are offset from each other, wavelength dependency may be strong, and the display may be yellowish.

Figure 5:
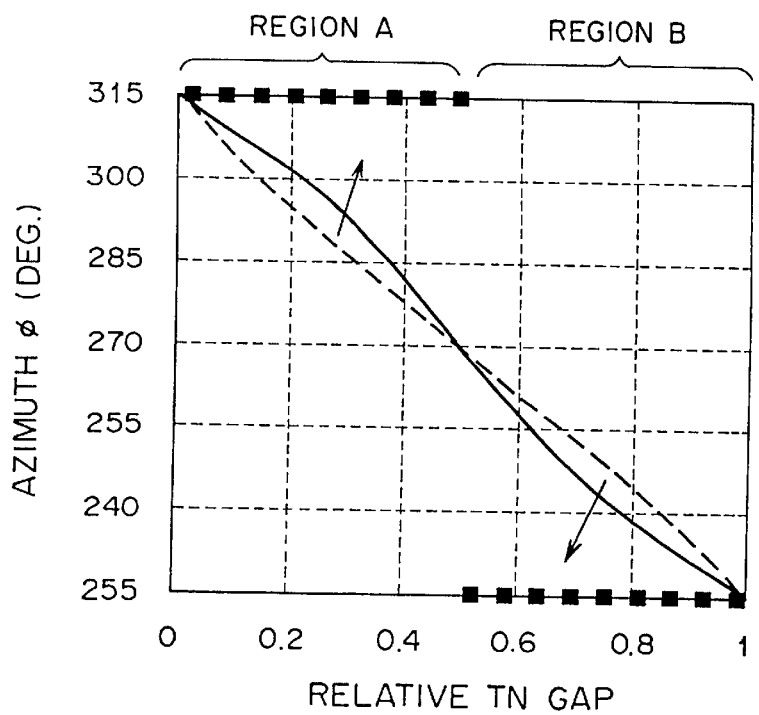
FIG. 5 is a graph showing the relationship between a relative TN gap of a TN liquid crystal layer and an azimuth.

FIG. 5 is a graph showing the relationship between a relative TN gap of a TN liquid crystal layer plotted on an abscissa and an azimuth plotted on an ordinate. Since the azimuth indicates an alignment direction of TN liquid crystal, the relationship between the relative TN gap and the azimuth represents the relationship between the relative TN gap and the alignment direction of TN liquid crystal. It should be note that the solid line indicates a characteristic curve of the embodiment of the present invention in which a helical pitch is 120 μm, and a broken curve of a conventional and general liquid crystal display device having a phase compensation film and a helical pitch of 40 μm. Both the characteristic curves are obtained by calculating an alignment state in a half-tone display having a drive voltage of 2.5V. A region A having a relative TN gap of 0 to 0.5 corresponds to the half of the TN liquid crystal layer 14 on the active matrix substrate 16 side. A region B in which a relative TN gap exceeds 0.5 corresponds to the half of the TN liquid crystal layer 14 on the color filter substrate 13 side.

In FIG. 5, a thick dotted line indicates an optical axis inclination direction of each phase compensation film provided to compensate for the regions A and B of a TN liquid crystal layer. As described above, since the optical axis of the phase compensation film is not twisted, the optical axis inclination direction is constant at an azimuth of 315° in the region A, and is constant at an azimuth of 225° in the region B.

A state that an alignment direction indicated by the azimuth of TN liquid crystal molecules becomes close to the thick dotted line in FIG. 5 generally means that compensation performance in the azimuth direction is high. A characteristic curve in the liquid crystal display device according to the embodiment of the present invention having a large helical pitch curves more than that in a general liquid crystal display device, and the compensation relationship of the phase compensation film is more approximate to an ideal state. More specifically, the image is suppressed from being yellowish.

Figure 6:
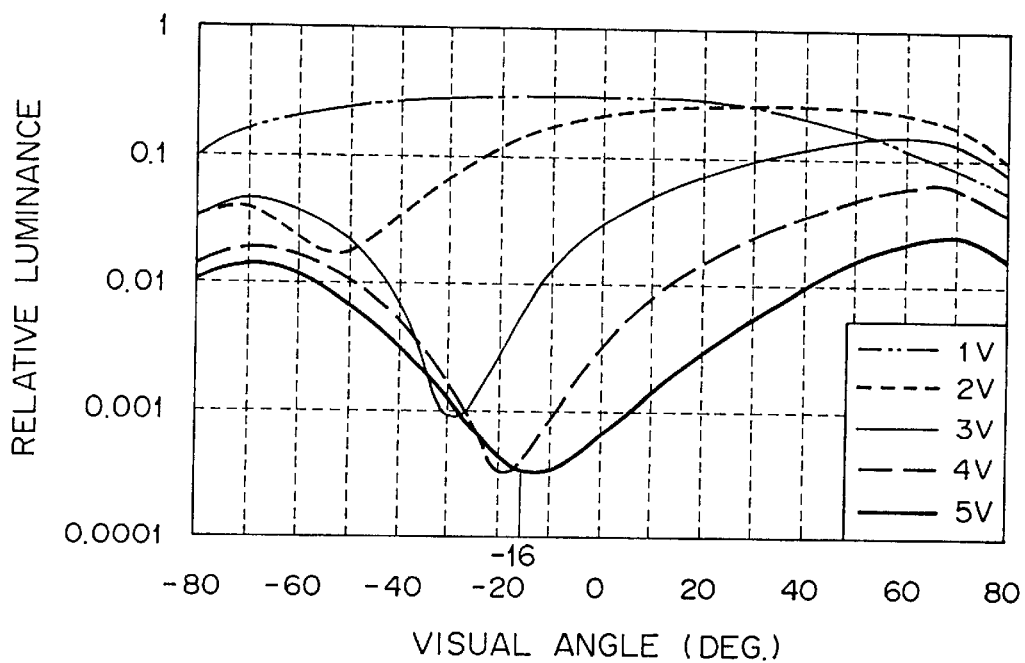
FIG. 6 is a graph showing the relationship between a viewing angle and a relative luminance when a helical pitch is set to be 120 μm.
Figure 7:
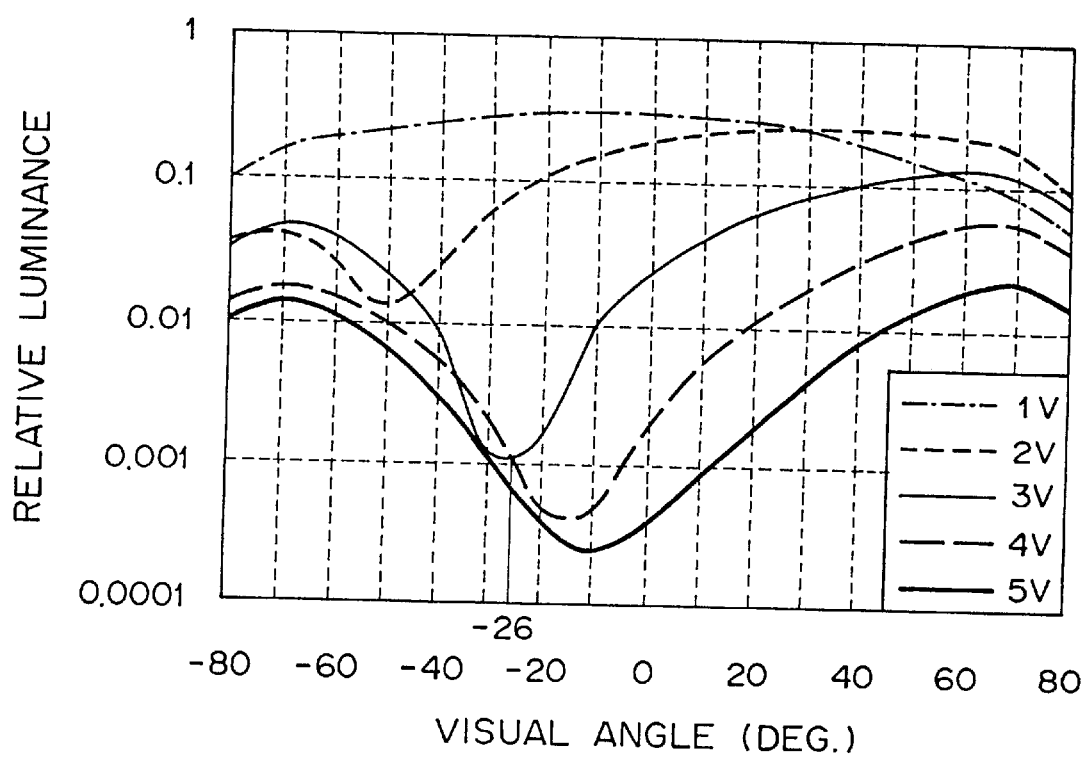
FIG. 7 is a graph showing the relationship between a viewing angle and a relative luminance when a helical pitch is set to be 40 μm.

Improvement on gradation inversion caused by the first embodiment will be described below. FIG. 6 is a graph showing the relationship between a viewing angle plotted on an abscissa and a relative luminance plotted on an ordinate when a helical pitch is set to be 120 μm. FIG. 7 is a graph showing the relationship between a viewing angle and a relative luminance when a helical pitch is set to be 40 μm. In FIGS. 6 and 7, a positive viewing angle represents the case wherein the screen is viewed from the upper side, and a negative viewing angle represents the case wherein the screen is viewed from the lower side. FIGS. 6 and 7 show the relationship between the viewing angle and a transmittance of a liquid crystal panel when a voltage applied to the TN liquid crystal layer is used as a parameter.

When the applied voltage is changed from 1V to 5V every 1V, and the viewing angle is gradually inclined from 0°, if the characteristic curves cross each other, gradation inversion occurs at a viewing angle obtained when the characteristic curves cross each other. As shown in FIG. 7, when the helical pitch is 40 μm, a gradation inversion angle in the downward direction is 16°. In contrast to this, as shown in FIG. 6, when the helical pitch is 120 μm, a gradation inversion angle in the downward direction is 26°. In this manner, the gradation inversion angle is advantageously increased by 10°, and a preferable display can be obtained. A range in which a relative luminance is 0.001 is a range of +10° to −30° in the vertical direction.

In the first embodiment, the phase compensation films are formed on both the surfaces of the liquid crystal panel 18. However, if a phase compensation film is formed on either one of the surfaces, the advantages of the present invention can be obtained.

The second embodiment of the present invention will be described below. In a conventional liquid crystal display device, in general, as described above, the helical pitch is about 40 μm. It is described in Japanese Unexamined Patent Publication No.8-95034 that a product Δn·d of the refractive index anisotropy Δn and the thickness d of the liquid crystal layer is preferably set to be 300 nm to 1,000 nm to make contrast, a response speed, and a viewing angle better. However, by only this arrangement, coloring in yellow and gradation inversion in the downward direction are not sufficiently improved. The resultant viewing angle does not mean a wide viewing angle.

In the second embodiment of the present invention, the helical pitch of a TN liquid crystal layer is set to be 60 μm or more, and the value of a product Δn·d (Δn×d) is regulated to be 320 to 480 nm. In this manner, hue can be advantageously improved, and gradation inversion is more improved. Therefore, a sufficiently wide viewing angle can be obtained.

Table 1 shows the relationship between the product Δn·d and a downward gradation inversion angle depending on a in helical pitch. In this case, a refractive index copy Δn is fixed to 0.08, and a gap is changed, so e product Δn·d should be changed from 280 nm to very 40 nm. Helical pitches are set to be 40 μm, 60 μm 120 μm.

TABLE 1

| Δn · d | Gradation Inversion Angle in Downward Direction (degree) | | |
|---|---|---|---|
| | Helical Pitch (μm) | | |
| (nm) | 40 | 60 | 120 |
| 280 | 15 | 15 | 20 |
| 320 | 15 | 18 | 23 |
| 360 | 16 | 19 | 25 |
| 400 | 16 | 19 | 26 |
| 440 | 17 | 20 | 26 |
| 480 | 17 | 19 | 23 |
| 520 | 19 | 19 | 18 |

As shown in Table 1, when a helical pitch of 60 μm having an effect of improving a hue, if the product Δn·d is 320 to 480 nm, a gradation inversion angle is larger than that obtained when the helical pitch is 40 μm. A gradation inversion angle obtained when the helical pitch is 120 μm is further large, and high improvement in gradation inversion can be advantageously obtained.

As described above, in the second embodiment, the product Δn·d of the refractive index anisotropy Δn in the crystal panel and the thickness d of the liquid crystal layer is about 0.3 to 0.4 μm. The hue is improved by a combination of the liquid crystal panel and a phase compensation film (phase plate) whose major axis is inclined.

In contrast to this, in the first prior art, a combination of an inclination type phase plate and a liquid crystal panel having a product Δn·d of 0.3 to 1.0 m is illustrated. In the second prior art, a combination of an inclination type phase plate and a liquid crystal panel having a product Δn·d of 0.36 μm is illustrated.

What is claimed is:

1. A liquid crystal display device comprising:

a light source;

a liquid crystal panel arranged on said light source, said liquid crystal panel including a twisted nematic liquid crystal layer having a helical pitch equal to or more than 60 μm; and a phase compensation film arranged on said liquid crystal panel, wherein said phase compensation film has optically negative anisotropy, and the direction of an optical axis of said phase compensation film is inclined from a normal direction of said phase compensation film, and wherein, when the refractive index anisotropy of said liquid crystal layer is represented by Δn, and the thickness of said liquid crystal layer is represented by d, the value obtained by calculating Δn×d is 320 to 480 nm.

2. A liquid crystal display device according to claim 1, wherein the thickness d of said liquid crystal layer is 3.0 to 6.0 μm.

3. A liquid crystal display device according to claim 1, wherein a chiral agent is added to said liquid crystal layer.

4. A liquid crystal display device according to claim 1, further comprising:

a first polarizing plate arranged on said phase compensation film; and a second polarizing plate arranged between said light source and said liquid crystal panel.

5. A liquid crystal display device according to claim 4, wherein the liquid crystal panel comprises:

first and second transparent substrates which are arranged substantially parallel to each other, said liquid crystal layer being arranged between said first and second transparent substrates; and an electric field former which forms an electric field in said liquid crystal layer in connection with an electric signal representing an image to be displayed.

6. A liquid crystal display device according to claims 4, further comprising a second phase compensation film arranged between said liquid crystal panel and said second polarizing plate.

7. A liquid crystal display device according to claim 6, wherein said second phase compensation film has optically negative anisotropy;

the direction of an optical axis of said second phase compensation film is inclined from said normal direction of said phase compensation film; and transmission axes of said first and second polarizing plates are offset from each other by substantially 90°.

8. A liquid crystal display device according to claim 4, wherein the thickness d of said liquid crystal layer is 3.0 to 6.0 μm.

9. A liquid crystal display device according to claim 4 wherein a chiral agent is added to said liquid crystal layer.

* * * * *